United States Patent [19]
Hilbig

[11] Patent Number: 5,326,443
[45] Date of Patent: Jul. 5, 1994

[54] CHLORINATING SYSTEM

[76] Inventor: Herbet Hilbig, P.O. Box 26217, Prescott Valley, Ariz. 86314

[21] Appl. No.: 976,321

[22] Filed: Nov. 13, 1992

[51] Int. Cl.$^5$ .................. C25B 9/00; C25B 15/08; C25B 15/02
[52] U.S. Cl. .................. 204/229; 204/237; 204/238; 204/275; 204/278
[58] Field of Search .................. 204/229, 275–278, 204/271, 237–238

[56] References Cited

U.S. PATENT DOCUMENTS

| | | | |
|---|---|---|---|
| 1,191,300 | 7/1916 | Goldman | 204/229 X |
| 2,701,790 | 2/1955 | Goument | 204/278 X |
| 3,117,066 | 1/1964 | Juda | 204/128 |
| 3,291,708 | 12/1966 | Juda | 204/128 |
| 3,351,542 | 11/1967 | Oldershaw et al. | 204/149 |
| 3,546,089 | 12/1970 | Schneider | 204/278 |
| 3,563,879 | 2/1971 | Richards et al. | 204/272 |
| 4,229,272 | 10/1980 | Yates | 204/128 |
| 4,290,873 | 9/1981 | Weaver | 204/228 |
| 4,439,295 | 3/1984 | Richards | 204/229 |
| 4,472,256 | 9/1984 | Hilbig | 204/266 |
| 4,493,760 | 1/1985 | Blanchi | 204/278 |
| 4,599,159 | 7/1986 | Hilbig | 204/266 |
| 4,808,290 | 2/1989 | Hilbig | 204/229 |
| 5,118,401 | 6/1992 | Oksman et al. | 204/229 X |
| 5,221,451 | 6/1993 | Seneff et al. | 204/229 |

*Primary Examiner*—Donald R. Valentine
*Attorney, Agent, or Firm*—Cahill, Sutton & Thomas

[57] ABSTRACT

An electrolytic chlorine gas generator is coupled to the return pipe of a pool water circulating system for introducing a chlorine-hydrogen gas mixture into the pool water. A gas/liquid delivery tube connecting the generator with the return pipe is sized to have an internal volume just sufficient to hold a quantity of gas which, when under pressure, has a volume substantially equivalent to the sum of the increased internal volume of the generator when subjected to return water pressure plus the decrease in the volume of the gas trapped in the vessel due to compression when subjected to return water pressure. Depletion of electrolyte in the generator increases the volume in the generator and allows pool water to enter the generator through the gas/liquid delivery tube to replace spent electrolyte automatically when the generator is pressurized.

10 Claims, 2 Drawing Sheets

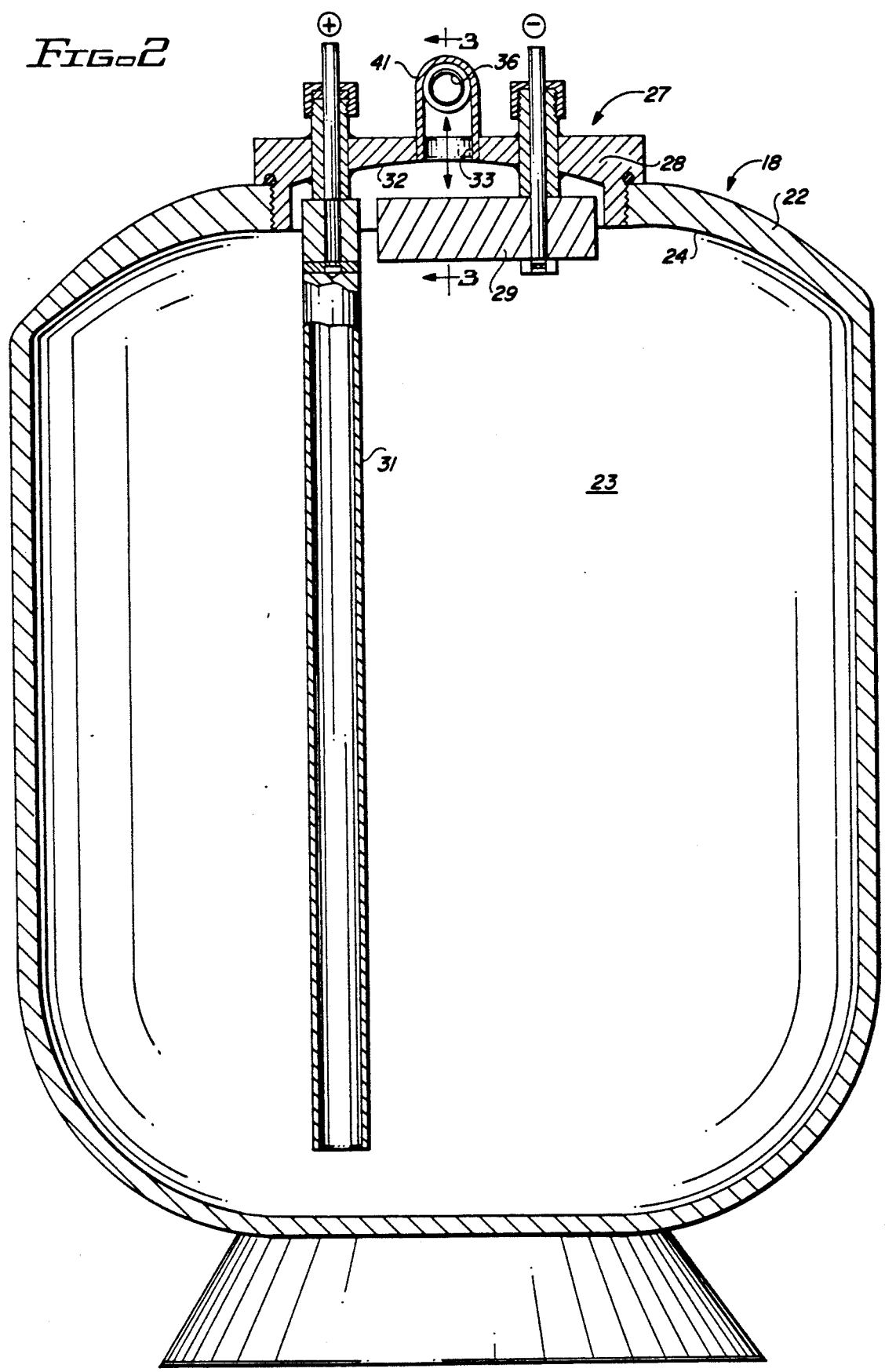

CHLORINATING SYSTEM

TECHNICAL FIELD

This invention is concerned with the production of chlorine gas and its introduction to a water stream. One specific application for the system of this invention is chlorinating residential swimming pool water to disinfect the water and prevent the growth of algae.

BACKGROUND ART

Pure chlorine is dangerous to handle and rarely used to chlorinate residential swimming pools. Commonly, chlorine has been introduced into swimming pool water by adding chemicals which decompose to yield chlorine. This technique, however, requires considerable labor to repetitively test the pool water and add the required chemicals.

It is becoming increasingly popular to equip swimming pool systems with devices which generate chlorine slowly at a rate comparable to that required by the pool and to generate the chlorine from chemicals which are relatively safe to handle. U.S. Pat. Nos. 3,563,879, granted Feb. 16, 1971, to J. M. Richards et al. for "Electrolytic Chlorine Generator" and 4,439,295, granted Mar. 27, 1984, to J. M. Richards for "Chlorine Generating Apparatus" disclose one breed of such devices.

The Richards' generators subject a sodium chloride solution to electrolysis to generate chlorine and hydrogen gases under pressure. The resulting gases are injected into the pool water return line. Both of the Richards' generators employ a fairly complex membrane-type electrolytic structure in an attempt to separate the chlorine and hydrogen gases, mixtures of which are highly explosive. Furthermore, the electrolytic decomposition of a salt solution in the Richards' generators also produces a sodium hydroxide solution byproduct which is introduced into the pool water and which can complicate the problem of maintaining a desired pH balance in the pool.

It is also well known that chlorine gas can be generated by electrolyzing an aqueous solution containing hydrochloric acid. A swimming pool chlorinating system of this type is disclosed in U.S. Pat. No. 3,351,542, granted Nov. 7, 1967, to C. F. Oldershaw et al. for "Electrolytic Chlorination and pH Control of Swimming Pool Water". Oldershaw et al. draw a solution of hydrochloric acid through an electrolytic cell where the solution is converted to a froth of chlorine, hydrogen and mild hydrochloric acid. This froth is sucked into the pool water circulating pump intake for mixing with the pool water.

The Oldershaw et al. system directs the corrosive chlorine, hydrogen, hydrochloric acid froth into the pool pump, and this is not desirable. Also, the repeated introduction of even mild hydrochloric acid may upset the pool pH balance. Oldershaw, et al. rely on a fairly complex combination of a capillary tube and a timer-controlled valve to regulate the flow of hydrochloric acid solution into the system. Also, there appears to be no special precautions in the Oldershaw et al. system for handling a potentially explosive mixture of chlorine and hydrogen.

There continues to be a need for a simple and safe chlorine generating system for use with residential swimming pools.

DISCLOSURE OF THE INVENTION

The chlorinating system of this invention employs a very simple chlorine generating unit. This is a vessel filled with a chloride-containing electrolyte, preferably an aqueous solution containing hydrochloric acid, and a pair of electrodes having low voltage direct current applied thereto. When the electrodes are energized, chlorine and hydrogen gases are generated which rise to the top of the vessel and are conveyed to the return line of the pool water circulating system.

The void volume in the generating vessel is kept at an absolute minimum to minimize the quantity of chlorine and hydrogen gases that are allowed to accumulate in the vessel. In accordance with the invention, this void volume is kept within an acceptable range by automatically, intermittently replacing electrolyte lost to hydrolysis with pool water from the return line. Replacement of lost electrolyte with pool water is accomplished by employing a gas and liquid delivery tube connecting the uppermost region of the generating vessel with the pool water return line. With the electrodes energized, gases generated in the vessel pass through this delivery tube into the pool water flowing through the return line. When the pool water circulating pump is on, the pool water return line is pressurized, which in turn pressurizes the delivery tube connected thereto. Indeed, immediately following start-up of the circulating pool pump, pool water is forced into the delivery tube, thus pressurizing the generating vessel. Since the generating vessel walls can flex under pressure, pressurization of the generating vessel causes the volume of the generating vessel to expand. Pressurization of the generating vessel also results in pressurization of any gases present in the upper portion of the generating vessel; accordingly, the volume occupied by such gases decreases in accordance with the amount of pressure applied. So long as the internal volume in the delivery tube approximately equals the expansion volume of the generating vessel (i.e., the increase in volume of the generating vessel due to the increased pressure) plus the decrease in volume of the pressurized gases trapped in the upper portion of the generating vessel due to the increased pressure, then pool water will enter and possibly fill the delivery tube, but will not enter the generating vessel when the pool pump is turned on.

When the pool pump is switched off and pressure is relieved, the generating vessel walls flex back to their original state, decreasing the volume of the generating vessel. Similarly, when the pressure is relieved, the gases in the upper portion of the generating vessel expand in accordance with Boyle's law. As a result, pool water that previously filled the delivery tube when the pump was running is pushed out of the delivery tube as a result of both the decreased generating vessel volume plus the expansion of the gases that were trapped in the upper portion of the generating vessel. Because the volume of the delivery tube is sized to approximately equal the change in volume of the generating vessel under pressure plus the change in volume of the trapped gases under pressure, the release of pressure resulting from turning the pool pump off causes all of the pool water that previously occupied the delivery tube to be displaced into the return line, so that no pool water remains in the delivery tube. When the pool pump is later switched on again, the steps are reversed, and the gas in the delivery tube is compressed and displaced by pool water; thus, the gas that formerly occupied the delivery tube is forced back into the generating vessel, but no additional pool water enters the generating vessel.

When, however, the level of electrolyte drops in the generating vessel due to the electrolyte being used up in hydrolysis, the void volume, i.e. the space in the upper portion of the generating vessel available for gases, increases. In this event, upon pool pump start-up, all of the gas that formerly occupied the delivery tube prior to start-up is forced out of the delivery tube, and in addition, a quantity of pool water equal to the volume of exhausted electrolyte enters the generating vessel until the vessel internal pressure is brought up to the pressure of water in the return line. Accordingly, the decreased volume of electrolyte resulting from hydrolysis is balanced by the volume of new pool water admitted into the generating vessel upon pump start-up, thereby returning the level of the electrolyte back to its original level.

In order for this electrolyte replacement phenomena to take place, the internal volume of the delivery tube must be approximately matched to the pressure conditions in the pool water return line and the expansion characteristics of the generating vessel. If for example, the delivery tube volume were too small, then fresh pool water would be admitted at each pump start-up, and electrolyte would be expelled into the delivery tube at each pump shut-down; this would tend to prematurely dilute the electrolyte over time. On the other hand, if the volume of the delivery tube were too large, then the electrolyte level will have to fall well below the desired level (i.e., near the top of the generating vessel) before fresh pool water will be forced into the generating vessel upon pool start-up, and this would permit dangerous quantities of explosive gases to accumulate in the upper portion of the generating vessel. This dictates that each installation be customized relative to the sizing of the delivery tube. However, this involves only very simple calculations as is explained hereinafter.

In addition to automatic replacement of exhausted electrolyte with pool water to minimize void volume, the system of this invention has other safety features as well.

The first such feature concerns location of the electrodes in the generating vessel. One of these electrodes is positioned and sized to occupy an upper region only of the vessel. Should the level of electrolyte drop to an undesirable low level, contact between the electrolyte and this electrode is lost, thus shutting down electrolysis and production of gas.

In recognition of the explosive nature of the chlorine-hydrogen gas mixture, and the fact that exposure to sunlight can set off an explosion, care is taken to isolate the gas mixture from ambient conditions. For ease of installation, the liquid-gas delivery tube is preferably flexible. In accordance with the invention, the delivery tube includes a length of double-wall tubing, the inner wall of which is corrosion-resistant and the outer wall of which is impervious to light.

One further feature is embodied in the electrical circuitry of the generating system which insures that the electrodes are energized only when the pool water circulating system is operating properly.

BRIEF DESCRIPTION OF THE DRAWINGS

The invention is described in greater detail hereinafter by reference to the accompanying drawings, wherein:

FIG. 2 is a vertical sectional view through a chlorine generating vessel employed in the system;

BEST MODES FOR CARRYING OUT THE INVENTION

System Generally

Figure 1:
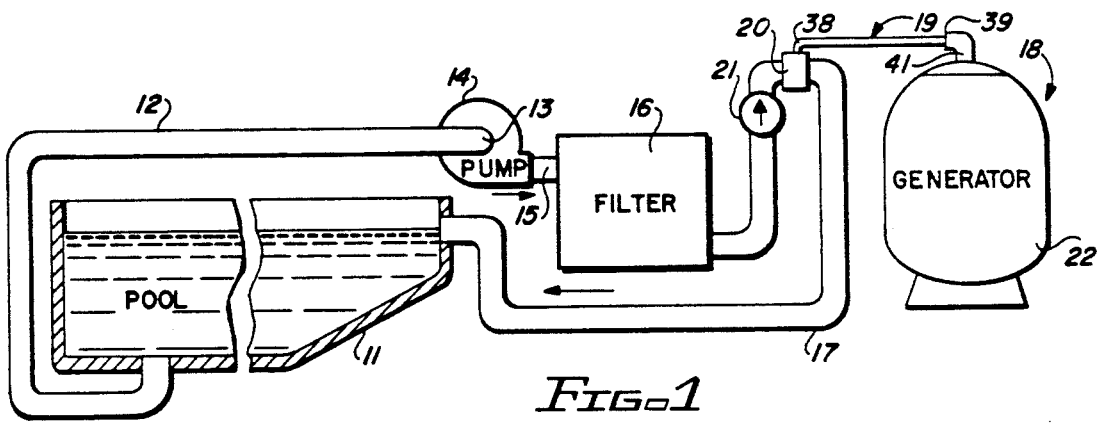
FIG. 1 is a diagrammatic illustration of a swimming pool chlorinating system embodying this invention.

FIG. 1 presents an overview of the setting in which this invention is employed, namely, as a chlorinating system for a swimming pool which is designated by reference numeral 11. The pool 11 is equipped with a conventional filtration system which includes an outlet pipe 12 for conveying water from the pool to the inlet 13 of a motor-driven circulating pump 14. The pump outlet 15 is connected to and delivers pool water to a filter 16. The filtered water leaving the filter is conveyed by a water return pipe 17 back to the pool 11.

In accordance with this invention, the system includes a chlorine generator 18 connected to the pool water return pipe 17 by a liquid and gas delivery tube means indicated generally by reference numeral 19. Chlorine generated in generator 18 is admixed with pool water in the return pipe 17. A check valve 21 is preferably located in return pipe 17 upstream of the connection 20 between delivery tube means 19 and the return pipe 17 to prevent the corrosive mixture of chlorinated water from flowing back into the filter 16 and pump 14 when the latter is not operating.

Chlorine Generator

Figure 3:
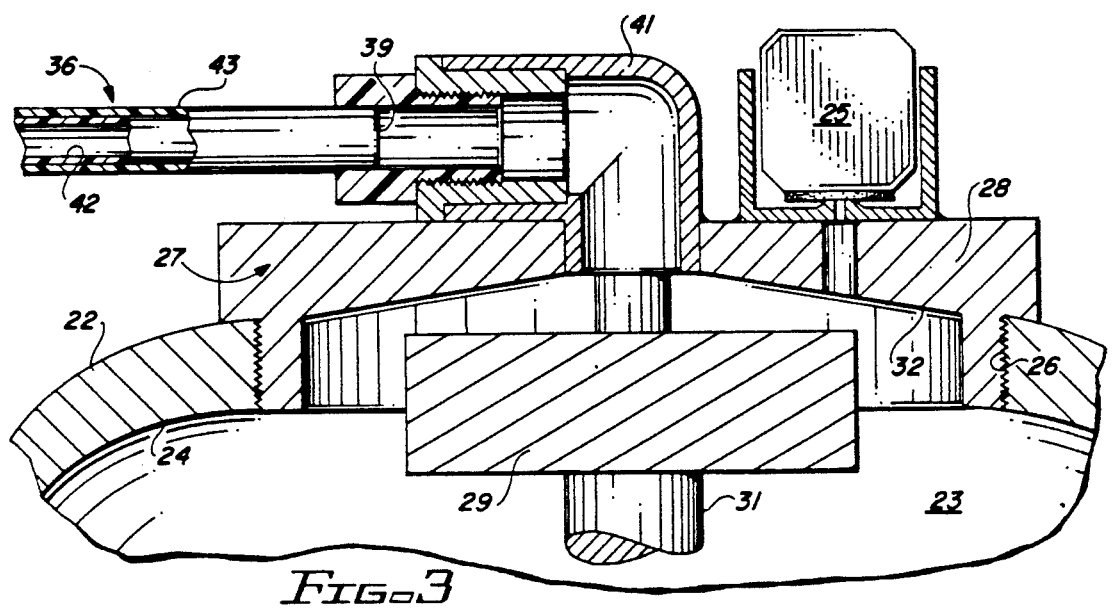
FIG. 3 is a fragmentary sectional view of the vessel taken as indicated by line 3—3 in FIG. 2.

FIGS. 2 and 3 illustrate in greater detail the construction of chlorine generator 18. The generator includes a vessel 22 adapted to be filled with a chloride-containing electrolyte 23. The electrolyte 23 is preferably muriatic acid, i.e. an aqueous solution of water and hydrochloric acid. The electrolyte is available in various strengths, and for this application, a concentration of 31.4% hydrochloric acid is preferred. At this strength, the required quantity of chlorine gas can be generated by electrolysis and yet the electrolyte is fairly safe for the average pool owner to handle.

Obviously, the generator vessel 22 must be inert to the electrolyte. Fiberglass reinforced resin vessels of the type commonly used to house sand filters for swimming pools are entirely adequate for this application. The vessel 22 preferably possesses a dome-like configuration in its upper region 24 and is provided with a threaded opening 26 in its uppermost region.

Generating vessel 22 is filled with electrolyte 23 through opening 26 which is closed by a closure assembly 27. Closure assembly 27 has a threaded base cap 28 which is received in sealing engagement with vessel opening 26. Base cap 28 is preferably fabricated from a corrosion-resistant, opaque, electrical insulating plastic material such as polyvinylchloride.

Closure assembly 27 also includes a pair of electrodes, namely, a cathode 29 and an anode 31 which are suspended in spaced relationship from base cap 28 and immersed in the electrolyte 23.

When a low voltage (2 v.–4 v.) direct current is applied to electrodes 29 and 31, electrolysis of electrolyte 23 occurs with chlorine gas ($Cl_2$) being liberated at the anode 21 and hydrogen gas ($H_2$) being liberated at the cathode 29. The liberated gases rise through the electrolyte 23 into a dome-shaped cavity 32 in the lower face of base cap 28. At the center of the dome-shaped cavity 32 is an opening 33 for the egress of gases from the generator 18. Egress opening 33 is disposed at the uppermost region of the interior of vessel 22. For reasons which are explained hereinafter, the interior of generator vessel 22 is filled as completely as possible so as to leave an absolute minimum of "void volume", i.e. gas containing space above the level of electrolyte 23. Ideally, the electrolyte must occupy most of the dome-shaped cavity 23 in cap 28 and completely cover cathode 29.

Closure assembly 27 also preferably includes a weighted relief valve 25 for relieving excess pressure in the generator. Valve 25 may be manually removed to assist in purging air from and completely filling vessel 22 with electrolyte prior to start up of the system.

It should be noted that the roles of the two electrodes 29 and 31 can be reversed without affecting operation of the generator 18. In other words, simply by reversing the polarity of the applied electrical current, electrode 31 can be caused to function as the cathode and electrode 29 can be caused to function as the anode.

The relative positioning of the two electrodes is significant so far as the invention is concerned. One electrode, the anode 31 as illustrated, preferably extends downwardly nearly to the bottom of vessel 22 so that the gas liberated thereby agitates and mixes the electrolyte as it rises upwardly toward opening 33. The other electrode, the cathode 29 as illustrated, preferably occupies only space near the uppermost region of the vessel. In this position, cathode 29 becomes uncovered to stop electrolysis if there is a significant drop in the level of electrolyte in the generator. This is deemed to be a safety feature.

Automatic Electrolyte Replacement

Another safety feature provided by this invention is automatic replacement of exhausted electrolyte with pool water. As alluded to previously, the objective is to keep the void volume in the generator 18 at a minimum, thus minimizing the quantity of potentially dangerous chlorine-hydrogen gas mixture allowed to accumulate in the generator.

Replacement of exhausted electrolyte is accomplished by taking advantage of the natural compression of the gases under pressure trapped in the upper portion of the generator vessel. Replacement of exhausted electrolyte with pool water from the return pipe 17 is controlled by properly sizing the internal volume of the delivery tube 36 forming a part of gas and liquid delivery tube means 19. The expansion and contraction characteristics of the fiberglass reinforced resin vessel of the type preferably employed in generator 18 can be easily measured. The walls of such vessels flex somewhat under pressure, thereby increasing the volume of the vessel when the pressure exerted inside the vessel is increased. For example, one 22-gallon vessel employed in practicing this invention was determined to expand one cubic inch in volume for each two pounds per square inch (psi) increase in pressure inside the vessel. By measuring the pressure in the return pipe 17 at the connection 22 between this return pipe and the tube means 19, it is possible to determine the pressure and, hence, the expansion to which the generator vessel 22 is subjected when the circulating pump 14 is operating.

In addition, as noted above, the hydrogen and chlorine gases trapped in the upper portion of dome-shaped cavity 32 in the lower face of base cap 28 occupy a volume which decreases as the pressure inside vessel 22 increases, in accordance with Boyle's law. For example, assuming that the gases under dome-shaped cavity 32 occupy a volume of 15 cubic inches when the pump is off at ambient conditions. Ambient atmospheric pressure is approximately 15 p.s.i. When the pump is turned on, the pressure exerted by the pressurized pool water on the trapped gas may rise to 15 p.s.i. above atmospheric pressure, or an absolute pressure of 30 p.s.i., effectively doubling the absolute pressure exerted on such gases. At twice the pressure, the same amount of gas will occupy half the volume.

Thus, there is a combined effect due to both expansion of the walls of the vessel, as well as compression of the trapped gas, that contributes to increased volume available inside the vessel when the pump is switched on. If the delivery tube volume is sized to account for this combined effect, then the amount of gas pushed from the delivery tube into the vessel upon pump start-up will just balance the increased available space, so that little or no pool water will enter the vessel, at least not until additional amounts of electrolyte are exhausted.

By maintaining a small volume of gas at the upper end of tank 22, loss of electrolyte is avoided as would otherwise occur when liberated hydrogen and chlorine gas bubble upwardly toward the delivery tube 19. Such gas bubbles could push electrolyte out of the tank and into the delivery tube if the electrolyte were in direct contact with the delivery tube. The small gas space serves to separate the liquid from the mouth of the delivery tube, and thereby prevent the loss of electrolyte.

By properly selecting the size of the delivery tube, loss of electrolyte through tank expansion and contraction is avoided. If the delivery tube volume were too small, then, upon pressurization, pool water would enter the tank, thereby diluting the electrolyte. Upon pump shutoff, the contraction of the tank would force some of the electrolyte out of the tank into the pool return line. However, by properly sizing the volume of the delivery tube, no pool water is admitted to the tank on pump start-up, and no electrolyte is lost on pump shut-down.

A typical residential pool installation may develop anywhere from three to six psi return pipe pressure over atmospheric pressure, although some may be as low as two psi and others as high as 40 psi. If we assume vessel 22 expands one cubic inch for each two psi of increased pressure due to the pump, and the return pipe pressure at connection 20 is measured to be 15 psi, then the total expansion volume of the vessel 12 with pump 14 operating will be 7.5 cubic inches. Further assume that the volume of "void space" between dome-shaped cavity 32 and the electrolyte level near the upper end of vessel 22 is 15 cubic inches with the pump off. When the pump turns on, the gas that formerly occupied the 15 cubic inch "void space" will now occupy only 7.5 cubic inches.

Thus, when the pump is turned on, there is a net increase in available space of 15 cubic inches, i.e., an additional 7.5 cubic inches due to vessel expansion, and an additional 7.5 cubic inches due to compression of the gas that initially occupied the "void space". If delivery tube 19 is properly sized, it will have a volume of approximately 30 cubic inches. Before pump start-up, that 30 cubic inches of volume will contain gas at atmospheric pressure; after pump start-up, the pressure on that 30 cubic inches of gas will be doubled, meaning that the same gas will now require 15 cubic inches of space, precisely the amount of additional volume made available due to pressurization of vessel 22 and the gas that was already trapped inside.

So long as the internal volume of tube means 19 is approximately equal the increase in the available volume inside vessel 22, pool water will enter and possibly fill tube means 19, displacing the gas originally contained thereby, but the pool water will not enter the vessel or dilute the electrolyte contained therein. However, if the level of electrolyte 23 drops in vessel 22 due to exhaustion of the electrolyte during hydrolysis, then the volume above the electrolyte increases. At the next pump start-up, the gas inside the vessel will be compressed by more than 7.5 cubic inches, as there was more gas to compress. However, the delivery tube only supplies enough gas to make up for compression of 7.5 cubic inches of the already existing gas. Accordingly, all of the gas within the delivery tube plus some of the pool water in tube means 19 will be injected into vessel 22 until the pressure in the vessel equalizes with the pressure in return pipe 17. The quantity of pool water injected into the vessel serves to replace the exhausted electrolyte 23 which has been used up in the electrolysis process and which accounted for the drop in the level of electrolyte in the vessel.

In order for the electrolyte replacement operation to function properly, it is desirable to customize the gas and liquid delivery tube means 19 for individual installations. With the vessel expansion characteristics known, measurement of the actual return pipe pressure at connection 20 with a clean filter 16 gives the information necessary to calculate total vessel expansion as discussed above. Also known, for a given vessel, is the volume of "void space" within the vessel above the electrolyte for a given desired level of electrolyte. It then becomes a simple matter of calculating the proper length of tube 36 between its one end 38 at the connection 20 and its other end 39 at an elbow connection 41 in communication with cap opening 33. Using the same example given above, with the vessel expansion of 7.5 cubic inches, and a "void space" of 15 cubic inches, then the tube must have a volume of gas occupying approximately 15 cubic inches under pressure with the pump on, or approximately double that amount, or 30 cubic inches, with the pump off. The volume of the delivery tube is the cross-sectional internal area (or pi times the square of the internal radius) of the tube multiplied by its length. Accordingly, assuming a constant diameter, the tube length is equal to the required volume of the tube divided by pi and divided by the square of the radius. If the tube 36 has an internal diameter of 0.50 inch, then the tube length can be calculated to be 30 cubic inches/3.14/(0.25)$^2$ = 152.9 inches, or approximately twelve to thirteen feet.

The volume of the delivery tube can be expressed in terms of a formula in the following manner:

$P_2$ = absolute pressure with pump on
$P_1$ = atmospheric pressure with pump off
$V_{void}$ = volume of "void space" when electrolyte is at desired level
$K_{exp}$ = linear expansion constant for vessel, expressed as additional cubic inches per rise in pressure (psi)

$V_{exp}$ = amount by which vessel expands
  = $K_{exp} \times (P_2 - P_1)$
$V_{comp}$ = amount original gas is compressed
  = $V_{void} \times (1 - P_1/P_2)$
$V_{press}$ = volume of gas to be displaced from delivery tube when under pressure
  = $V_{exp} + V_{comp}$
  = $[K_{exp} \times (P_2 - P_1)] + [V_{void} \times (1 - P_1/P_2)]$
$V_{unpress}$ = volume of gas to occupy delivery tube at atmospheric pressure with pump off
  = $[P_2/P_1] \times V_{press}$
  = $[P_2/P_1] \times [K_{exp} \times (P_2 - P_1)] + [V_{void} \times (1 - P_1/P_2)]$.

$V_{unpress}$ corresponds to the approximate desired volume of the delivery tube means in order to maintain the electrolyte level without unduly diluting the electrolyte.

Shortly after generator vessel 22 has been pressurized, regardless of whether or not pool water enters the vessel, if an electrical potential is impressed across the electrodes 29 and 31, gaseous chlorine and hydrogen are liberated from the electrolyte 23. The resulting build up of gas pressure in the generator 18 quickly exceeds the pressure of water in return pipe 17. This gas pressure pushes any water in the tube means 19 back into the return pipe 17 and injects the chlorine-hydrogen gas mixture into the pool water flowing through the return pipe. Once in the pool water, the chlorine reacts with the pool water to form hypochlorous acid (a desired disinfectant) and mild hydrochloric acid (for pH control). The hydrogen does not react with the pool water and escapes to the atmosphere.

It should again be noted that the chlorine-hydrogen gas mixture flowing through the gas and liquid delivery tube means 19 is highly explosive and can be set off by bright sunlight. Since at least a portion of delivery tube 36 is likely to be exposed to sunlight, the tube must be constructed to prevent the light from reaching the gas mixture therein. This is preferably accomplished by forming tube 36 with two concentric walls. As shown in FIG. 3, the inner tube 42 of tube 36 is preferably formed of a corrosion resistant plastic material, such as polyflurotetraethylene, while the outer tube 43 is formed of an opaque, black plastic material, such as polyethylene. Both materials are flexible and easy to cut to length.

It should be also noted that the delivery tube means 19 need not necessarily employ a tube of uniform diameter throughout its length. Different cross sections can, if desired, be employed so long as the requisite volume is provided.

Automatic Generator Shutdown

It is possible for the system previously described to experience significant electrolyte depletion beyond that which can be overcome by injecting pool water. Such a condition might occur if the vessel 22 springs a leak or if the pool filter becomes clogged and the pressure in return pipe 17 drops drastically. The latter condition could result in less replacement pool water being pumped into generator vessel 22 through tube means 19.

As mentioned previously, one of the electrodes, cathode 29 as illustrated, occupies only an uppermost region of the vessel 22. Thus, any significant drop in the level of the electrolyte 23 in vessel 22 will uncover the cathode, breaking the current flow and stopping the electrolysis process. The construction is such that this occurs preferably when less than one percent of the volume of electrolyte 23 is used or lost.

Electrical Circuitry

Figure 4:
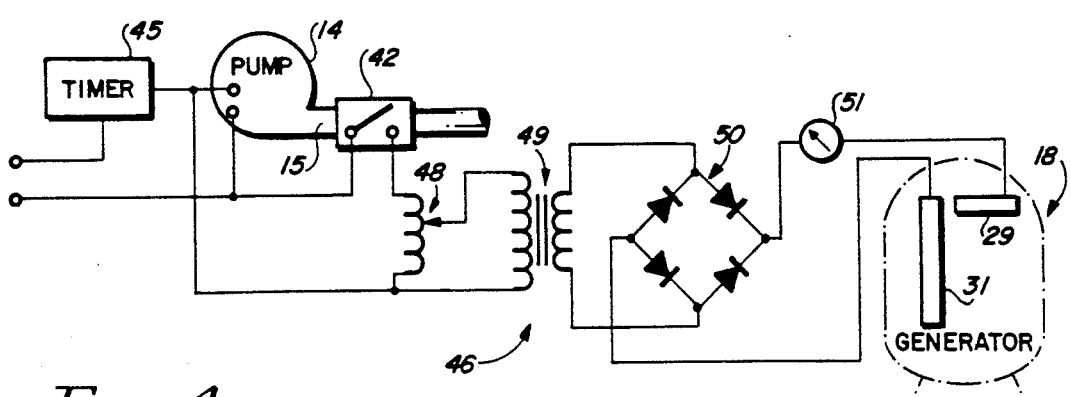
FIG. 4 is a schematic diagram of an electrical circuit employed in the system.

For obvious reasons, the chlorine generator 18 should not be energized with electrical energy unless the pool circulating pump 14 is energized and operating properly. The electrical circuitry giving this assurance is illustrated diagrammatically in FIG. 4.

Energization of circulating pump 14 is controlled by a conventional timer switch 45 connected in series with the pump. The power supply for the chlorine generator 18 is designated in FIG. 4 by reference numeral 46. It will be noted that this power supply is connected in parallel with the pump 14 so that the power supply can be energized only when the pump is energized. It is further to be noted that the supply of electrical energy to the power supply 46 is under the control of a flow detection switch 47 connected to the outlet 15 of pump 14. Switch 47 is normally open and closes only upon detecting flow of water out of the pump. Switch 42 may be either pressure responsive or flow responsive; the purpose of the switch is to prevent energization of power supply 46 if pump 14 is not operating properly, for example, if the pump has lost its prime.

Power supply 46 for chlorine generator 18 is more or less conventional, comprising a variable resistor 48, a voltage step-down transformer 49, and a full wave rectifier bridge 50. Direct current from the bridge 50 is supplied to generator electrodes 29 and 31. If desired, an ammeter 51 may be included in the circuit to the electrodes 29 and 31. The presence of a lower than normal current flow to the electrodes may indicate depletion of hydrochloric acid in the electrolyte 23 and signals the user to replace the electrolyte before damage to the electrodes occurs.

From the foregoing, it should be apparent that this invention provides a simple, inexpensive, safe and easy-to-use chlorinating system suitable for use with residential swimming pools. While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

What is claimed is:

1. A pool chlorinating system comprising a pump for circulating pool water, said pump having an inlet and an outlet, said pump delivering pressurized pool water from its outlet, a vessel, said vessel having an internal volume which is capable of changing when said vessel is subjected to pressure from within said vessel, said vessel being adapted to contain a chloride-containing electrolyte, electrolytic means in said vessel for releasing chlorine gas from said electrolyte, and gas and liquid delivery tube means having one end in communication with an uppermost region of said vessel and its opposite end in communication with the pressurized pool water delivered by said pump, said electrolyte having an upper level defining a void space between the upper level of said electrolyte and the uppermost region of said vessel, said tube means having an internal volume between its ends wherein said internal volume is wherein $P_2$ = absolute pressure inside the vessel with the pump on;

$P_1$ = atmospheric pressure, i.e., pressure inside the vessel with the pump off;

$V_{exp}$ = amount by which vessel expands at pressure with pump on; and $V_{comp}$ = amount by which the original gas trapped in the void space between the electrolyte level and the uppermost region of said vessel is compressed when the pump is turned on.

selected in accordance with the volume of the void space, the amount of expansion undergone by said vessel when subjected to the pressure generated by said pump at the opposite end of the tube means, and the pressure exerted inside the vessel when the pump is on.

2. The pool chlorinating system of claim 1 wherein the internal volume of said tube means is approximately equal to $[P_2/P_1] \times [V_{exp} + V_{comp}]$.

3. The pool chlorinating system of claim 1, further characterized in that said electrolytic means includes first and second electrodes and said first electrode is positioned in the uppermost region of said vessel.

4. The pool chlorinating system of claim 3, further characterized in that said second electrode has at least a portion thereof extending into a lower region of said vessel.

5. The pool chlorinating system of claim 1, further characterized in that said electrolytic means includes first and second electrodes and said first electrode is positioned in the uppermost region of said vessel.

6. The pool chlorinating system of claim 5, further characterized in that said second electrode has at least a portion thereof extending into a lower region of said vessel.

7. The pool chlorinating system of claim 1, further characterized in that said tube means is impervious to light.

8. The pool chlorinating system of claim 7, wherein said tube means comprises two coaxial tubes with the inner tube being corrosion resistant and the outer tube being impervious to light.

9. The pool chlorinating system of claim 1, further comprising a source of intermittent electrical energy for powering said pump, a power supply for said electrolytic means, said power supply receiving electrical energy from the same source as said pump, and means for detecting the flow of pool water from the outlet of the pump, said detecting means interrupting the flow of electrical energy from said source to said power supply when it detects less than predetermined minimum flow from said pump.

10. A chlorine gas generator comprising a closed vessel, said vessel having an uppermost region, a gas outlet at the uppermost region, said vessel being adapted to contain a chlorine containing liquid electrolyte in said vessel, and first and second electrodes positioned in said vessel, said first electrode occupying space solely within the uppermost region of the vessel whereby said first electrode is out of contact with the electrolyte if the level of the electrolyte drops in the vessel, and wherein said second electrode has at least a portion thereof extending into a lower region of the vessel.

* * * * *

UNITED STATES PATENT AND TRADEMARK OFFICE
CERTIFICATE OF CORRECTION

PATENT NO. : 5,326,443
DATED : July 5, 1994
INVENTOR(S) : Herbert Hilbig

It is certified that error appears in the above-identified patent and that said Letters Patent is hereby corrected as shown below:

On the title page, item [75] Inventor:
The name of the inventor is changed from "Herbet Hilbig" to -- Herbert Hilbig --.

Signed and Sealed this

Twentieth Day of September, 1994

Attest:

BRUCE LEHMAN

Attesting Officer

Commissioner of Patents and Trademarks